Feb. 20, 1962 C M. KATTERJOHN 3,021,959
NESTABLE STACKING TRAY
Filed Dec. 14, 1959 2 Sheets-Sheet 1
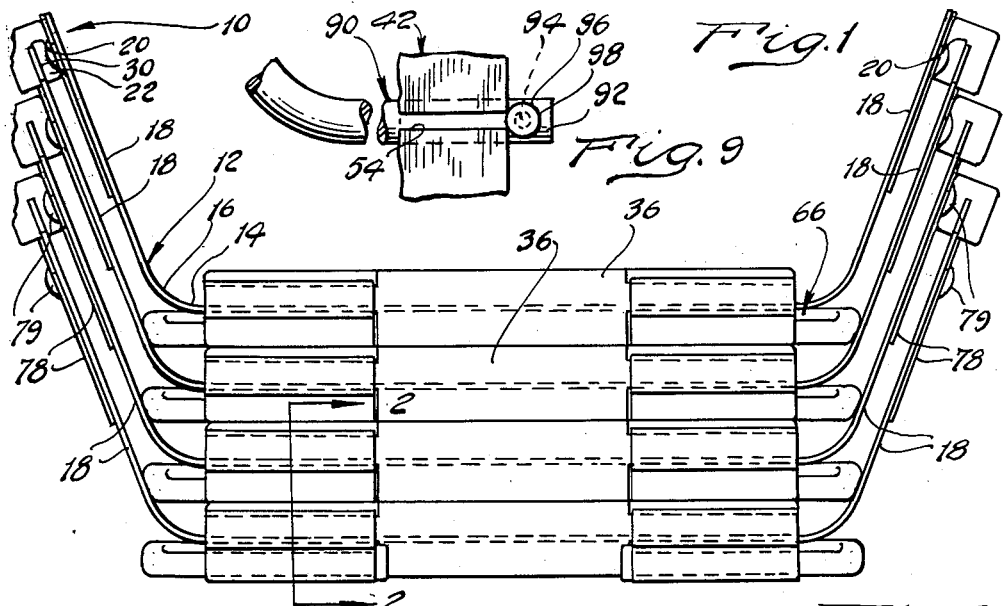
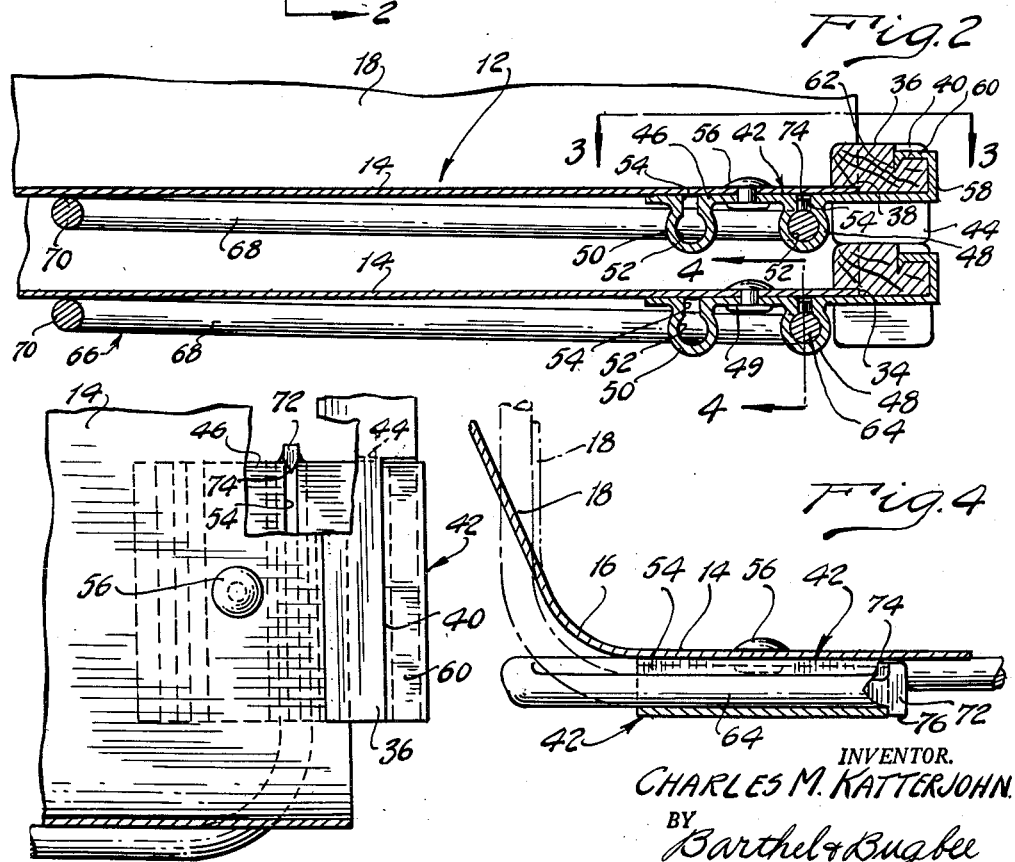
INVENTOR.
CHARLES M. KATTERJOHN
BY
Barthel & Bugbee
ATTORNEYS.

Feb. 20, 1962
C. M. KATTERJOHN
3,021,959
NESTABLE STACKING TRAY
Filed Dec. 14, 1959
2 Sheets-Sheet 2
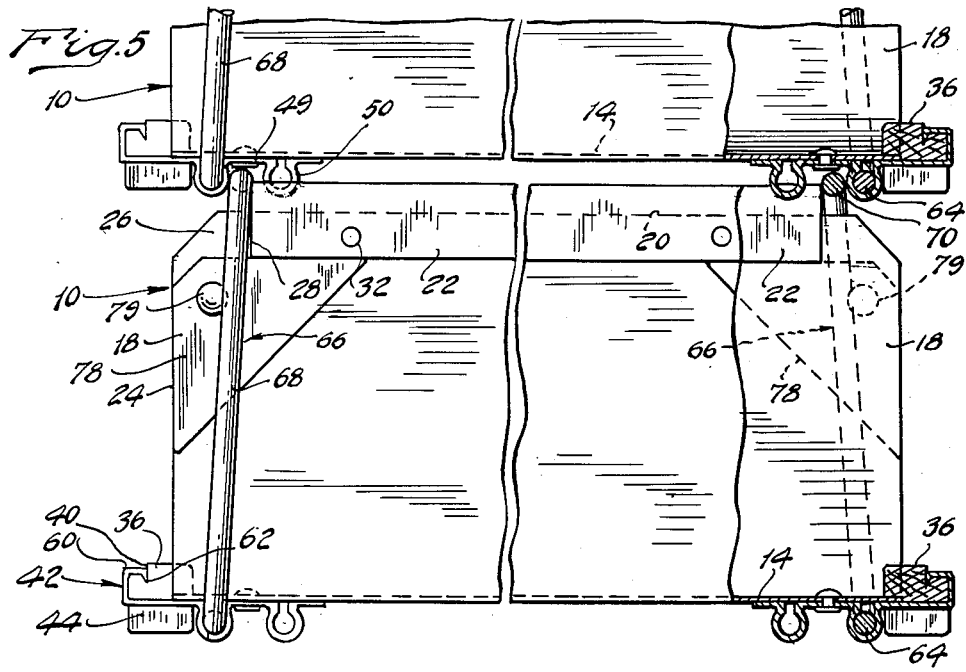
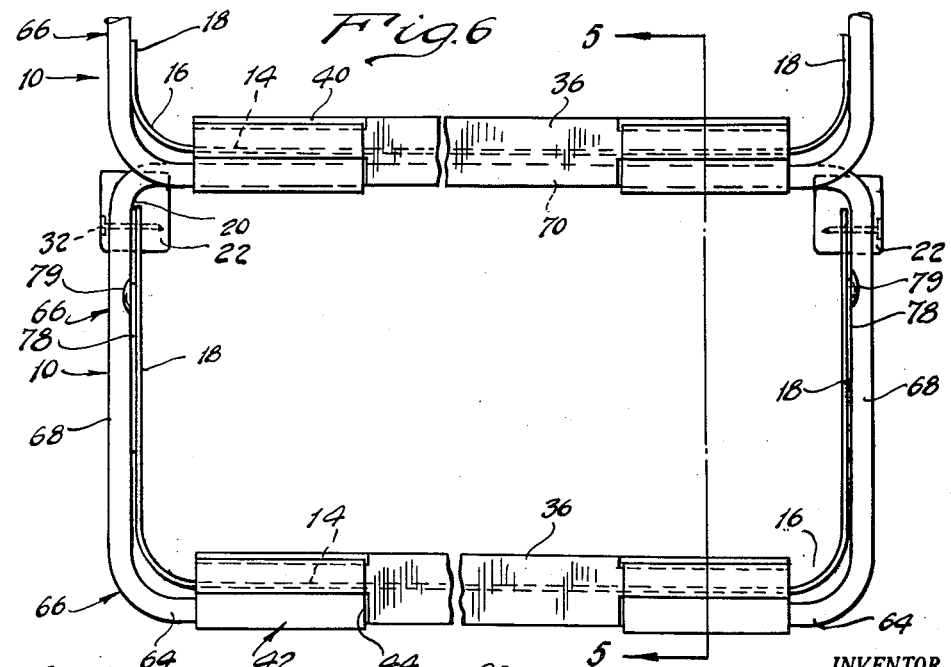
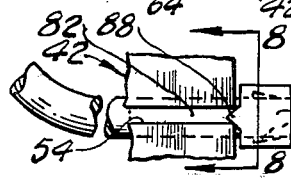
INVENTOR.
CHARLES M. KATTERJOHN.
BY
Barthel + Bugbee
ATTORNEYS.

United States Patent Office 3,021,959
Patented Feb. 20, 1962

3,021,959
NESTABLE STACKING TRAY
Charles M. Katterjohn, P.O. Box 463, Henderson, Ky.
Filed Dec. 14, 1959, Ser. No. 859,437
14 Claims. (Cl. 211—126)

This invention relates to bread delivery trays, such as are used in bakery delivery trucks for carrying loaves of bread from the bakery plant to the retail store, and, in particular, to nesting bread delivery trays adapted to be packed in nested relationship when empty in order to economize on space during the return run of the truck.

One object of this invention is to provide a nesting bread delivery tray which in its bread-loaf-carrying position has side walls which are held substantially vertical by swinging bail rods which also serve to assist in supporting stacked loaded trays during delivery of the bread loaves, but which, when the bail rods are swung outward and downward to a position beneath the empty tray, enable the side walls to flare or spring outward at a slight angle to the vertical sufficient to permit empty trays to be superimposed or packed in nested relationship so as to occupy only a fraction of the space occupied by the loaded trays.

Another object is to provide a nesting bread delivery tray of the foregoing character wherein the tray body is of inexpensive resilient material, such as of resilient wood composition sheet material, so that the tray body in its relaxed condition has outwardly-inclined side walls permitting superimposed nesting, but which are pushed upward into vertical positions by the operator while he swings the bail rods upward from beneath the tray outside and over the side walls to secure the side walls temporarily in their vertical positions for loading and stacking.

Another object is to provide a nesting bread delivery tray of the foregoing character wherein the lower or free ends of the bail rods are journaled in sockets provided in metal bearing plates secured to the bottom wall of the tray body at opposite end corners thereof so as to furnish a smooth operating bail rod mounting which is also durable and yet inexpensive.

Another object is to provide a nesting bread delivery tray, as set forth in the object immediately preceding wherein the sockets are formed as tubular loops in the metal bearing plates, preferably by extrusion, each tubular loop having a slot in its upper side at its junctions with the remainder of the bearing plate into which fits a corresponding flattened detent portion, prong or attachment formed or affixed near the free end of the bail rod, the flattened detent portion, prong or attachment being automatically withdrawn from the end of the slot when the bail rod is swung from its retracted position beneath the tray body bottom wall around the end thereof into an approximately vertical stacking position, bringing and holding the tray body side walls likewise in their vertical positions for loading and stacking.

Another object is to provide a nesting bread delivery tray, as set forth in the two objects immediately preceding, wherein the bearing plate is also provided with a second tubular loop parallel to and spaced apart from the first loop, thereby forming a recess between the two loops which serves to receive and hold the upper corner of the bail rod of the loaded tray upon which it is stacked, the tubular loops preventing shifting of the trays in the stacks of loaded trays during transportation in a truck or other vehicle.

Another object is to provide a nesting bread delivery tray open at both ends as set forth in the three objects immediately preceding, wherein an end rail is mounted transversely of the tray body at each end of the bottom wall thereof, and wherein each bearing plate has an integral extension of approximately J-shaped cross-section at its forward edge. this extension passing across a notch in the lower side of one end of one end rail, the end edge of the extension being downturned and hooked into a rabbet in the upper outer edge of the end rail to firmly secure the bearing plate to the end rail, the bearing plate and end rail being in turned secured to the tray body bottom wall so as to tie all of these elements strongly together.

Other objects and advantages of the invention will become apparent during the course of the following description of the accompanying drawings, wherein:

FIGURE 1 is an end elevation of a stack of nesting bread trays, according to one form of the invention, disposed in their empty nested positions;

FIGURE 2 is a longitudinal section through two of the nested empty bread trays, taken along the line 2—2 in FIGURE 1;

FIGURE 3 is a fragmentary horizontal section, mainly in top plan view, taken along the line 3—3 in FIGURE 2;

FIGURE 4 is a fragmentary vertical cross-section through one corner of a single tray, taken along the line 4—4 in FIGURE 2;

FIGURE 5 is a side elevation of a pair of nesting bread trays with their side walls sprung into their vertical positions after loading and held in these positions by the upwardly-swung bail rods upon the tops of which the superimposed tray rests, the central portions of the tray bodies and the upper portion of the upper tray being omitted to conserve space and increase the scale of the drawing;

FIGURE 6 is a left-hand end elevation of the stacked tray assembly shown in FIGURE 5;

FIGURE 7 is a fragmentary top plan view of one end of a bail rod provided with a detent and stop of modified construction;

FIGURE 8 is a cross-section taken along the line 8—8 in FIGURE 7; and

FIGURE 9 is a fragmentary top plan view of one end of a bail rod provided with a detent and stop of further modified construction, with the adjacent structure.

Referring to the drawings in detail, FIGURES 1, 5 and 6 show a plurality of nesting bread trays, each generally designated 10, according to one form of the invention as arranged for nested packing and for loaded stacking respectively. Each bread tray 10 has a body portion, generally designated 12, formed of resilient sheet material, such as from a resilient wood composition board, with a central bottom wall 14 joined by curved junction portions 16 to opposite side walls 18 which, in the relaxed position of the tray for nesting, are inclined away from one another at a suitable slight angle. In FIGURE 1, the inclinations of the side walls are exaggerated in order to portray the invention more clearly. In actual practice, the side walls are preferably inclined outwardly at angles of approximately five degrees to the vertical. Each of the upper edges 20 of the side walls 18 is provided with an elongated side rail 22 conveniently made of wood extending therealong but terminating slightly short of the opposite ends 24 of the side walls 18 (FIGURE 5) so that there is a space 26 between the ends 28 of the side rails 22 and the ends 24 of the side walls 18. The side rails 22 are grooved as at 30 (FIGURE 1) to receive the upper edges 20 of the side walls 18 and held in assembly therewith by fasteners 32 and glue.

Mounted at the opposite ends 34 of the bottom wall 14 of each body portion 12 is an end rail 36 also conveniently made of wood, and slotted as at 38 on their rear or inner faces (FIGURE 2) to receive the ends 34. Each end rail 36 near its upper forward edge is provided with a rabbet 40 for anchorage of a bearing plate generally designated 42, in the manner described below. Each bearing plate 42, of which there are four, occupies a corner position adjacent the end of one of the curved junction portions 16 (FIGURES 1 and 3) and extends forwardly through a notch 44 in one end of each end rail 36, as explained below.

Each bearing plate 42 consists preferably of a short section sawed or otherwise cut off from an elongated extrusion of metal of the cross-section shown in FIGURE 2, aluminum or aluminum alloys having been found to be convenient for this purpose. Each bearing plate 42 is of approximately rectangular outline when viewed in top plan view (FIGURE 3), and has a plate-shaped central or main portion 46 containing downwardly-extending outer and inner tubular bearing loops 48 and 50 disposed in spaced parallel relationship to form a recess 49 between them (FIGURE 2). Each loop 48 or 50 has a bearing bore 52 and an entrance slot 54 at the top thereof. The main portion 46 between the tubular loops 48 and 50 is drilled or punched, and the bottom wall 14 of the tray body 12 similarly drilled or punched to receive a bolt, rivet, or other fastener 56 by which the bearing plate 42 and bottom end rail 36 are secured to the bottom wall 14. The bolt 56 is preferably of the stove bolt type with a low-lying head at the top and a thin insert nut at the bottom (FIGURE 2). In place of the bolt 56 there may be substituted a rivet with a large diameter truss or wagon box head at the top and with a tubular or semi-tubular shank extending downward from the top.

Each bearing plate 42 (FIGURE 2) has its forward portion extending through the notch 44 with its edge abutting the end thereof and continues in an upturned end portion 58 which at its upper edge continues in a rearwardly-directed top portion 60 disposed parallel to the main portion 46 and terminates in a downturned sharp edge flange 62. The upturned end portion 58 extends upwardly along the front face or outer face of the end rail 36, the top portion 60 extends into the rabbet 40, and the downturned sharp flange 62 bites into the corner of the rabbet 40 to secure the end rail 36 and bearing plate 42 to one another.

Rotatably mounted in the bores 52 of the forward tubular loops 48 of the bearing plates 42 are the lower free end portions 64 of bail rods or tray supporting frames, generally designated 66, of interrupted rounded-cornered rectangular outline (FIGURE 6) having parallel side portions 68 and a top or bridge portion 70 interconnecting the side portions 68. The side portions 68 are of such lengths as to space the top or bridge portion 70 slightly above the upper edges 20 of the tray body side walls 18 when the ends 64 are seated in the bearing plates 42 so as to hold the side walls 18 in parallel vertical positions. The end portions 64 terminate in diametrically-thinned and flattened detent portions 72 disposed at right angles to the plane of the bail rod 66. Detent portions 72 are provided with wedge-shaped detent prongs 74 which extend into the inner ends of slots 54 in the forward tubular loops 48 (FIGURE 3) when the plane of the bail rod or tray-supporting frame 66 is horizontal, and the side and top portions 68 and 70 thereof lie beneath the bottom wall 14 of the tray body 12 (FIGURE 2).

The bail rods or tray-supporting frames 66 are preferably of aluminum or other suitable material having sufficient resilience or "spring" to urge the detent prongs 74 outward into the inner ends of their respective slots 54, while flattened stop portions 76 diametrically opposite the detent prongs 74 limit the depth of entry of the detent prongs 74 into their respective slots 54. Riveted or otherwise secured in the spaces 26 at each of the upper corners of the side walls 18 (FIGURE 5) is a trapezoidal-shaped reinforcement plate 78 of metal or other suitable material having a detent protuberance 79 struck up from the surface thereof. The detent protuberances 79 yieldably and releasably hold the side portions 68 of the bail rods 66 from swinging outward from their stacking positions against the ends 28 of the side rails 22.

The modified bail rod, generally designated 80, of which only one end portion 82 is shown (FIGURE 7) is provided with struck-up splines 84 upon which is forced a stop collar 86 having a wedge-shaped prong 88 projecting axially therefrom toward the bail rod end portions 82. The collar 86 is also preferably press-fitted on the end portion 82 of the bail rod 80 and then compressed in a press so as to bury the splines 84 in the wall of the collar 86. These splines 84 not only prevent the collar 86 from rotating relatively to the rod end portion 82 but also prevent the collar 86 from backing off the rod end portion 82.

The further modified bail rod, generally designated 90, of which only one end portion 92 is also shown (FIGURE 9) is bored transversely or radially at 94 to receive a rivet 96, the head 98 of which projects from the rod end portion 92 to form a detent projection thereon. In the operation of the further modified bail rod 90, the outward spring of the bail rod end portions 92 resiliently urges the heads 98 of the rivets 96 into the ends of the slots 54 in the forward loops 48 of the bearing plates 42 in a manner similar to that of the prongs 72 (FIGURE 3) or the prongs 88 (FIGURE 7) so as to hold the bail rod yieldably and releasably in position.

In the operation of the invention, let it be assumed that the bail rods or tray-supporting frames 66 occupy their retracted positions of FIGURES 1 to 4 inclusive after having been swung downwardly, inwardly and upwardly by approximately three-quarters of a revolution from their upstanding positions of FIGURES 5 and 6 with their top and side portions 70 and 68 resting adjacent the underside of the bottom wall 14 of the tray body 12. The bail rods or tray-supporting frames 66 are held in their retracted positions by the yielding engagement of detent prongs 74 with the inner ends of their respective slots 54 in the forward loops 48 of the bearing plates 42. With the parts in the positions of FIGURES 1 to 4 inclusive, the resilience of the tray body side walls 18 causes them to swing outwardly into the inclined position shown in FIGURE 1, whereupon the nesting trays 10 may be superimposed upon one another to occupy the minimum of space for shipment or empty return, as shown in FIGURE 1.

The trays 10 are most easily loaded in their outwardly-flared positions (FIGURE 1). After loading, to prepare the trays 10 for stacking, the operator swings the bail rods 66 (FIGURE 2) through approximately three-quarters of a revolution into approximately vertical but slightly inclined positions (FIGURE 5) with the upper ends of the side portions 68 disposed in the spaces 26 and resting against the opposite ends 28 of the side rails 22 as stops. This action causes the bevelled detent prongs 74 on the ends of the end portions 64 automatically to move inwardly toward one another by camming themselves out of the inner ends of the slots 54 in the forward tubular loops 48 of the bearing plates 42. At the same time, the upward swinging of the bail rods 66 causes their parallel vertical side portions 68 to engage the end edges 24 of the tray body side walls 18 with a camming action which automatically urges the side walls 18 from the inclined positions of FIGURE 1 to the parallel vertical positions of FIGURE 6. The operation of the trays 10 when equipped with the modified bail rods 80 or 90 of FIGURE 7 or 9 is similar to that described above. The wedge-shaped detent prongs 88 or rivet heads 98 enter the slots 54 as before and are cammed out of them by the swinging of the bail rods 80 or 90 as with the bail rods 66.

After being loaded with bread or other articles each of the trays is arranged in this manner in its stacking position and stacked. The slightly inclined bail rods 66 are lodged against the ends 28 of the side rails 22 to prevent their moving toward one another. The loops 48 of the bearing plates 42 on the tray above prevent the bail rods 66 from moving outwardly away from one another. The interrelationship of the loops 48, the bail rods 66 and the ends 28 of the side rails 22 prevents longitudinal slipping when trays are interstacked. Sidewise slippage is prevented by the outer ends of the tubular portions 50 of the bearing plates 42 engaging the inner surfaces of the upper side rails 22 of the tray body 12.

After the bread loaves or other articles have been delivered, the operator rearranges the trays 10 in nestable form by grasping the top portions 70 of the bail rods 66 and pulling them outwardly and downwardly away from one another, swinging them through approximately three-quarters of a revolution until the bail rods 66 again occupy their retracted positions beneath the bottom wall 14 of each tray body 12 (FIGURE 2), and the detent portions 74, detent prongs 88 or rivet heads 98 on the ends of bail rods 66 snap into their respective slots 54, thus holding the bail rods 66 in their retracted positions. When thus released by the parallel side portions 68 of the bail rods 66, the tray side walls 18 snap into their inclined positions of FIGURE 1 by reason of their inherent resilience, thereafter permitting trays 10 to be superimposed upon one another for packing or transportation.

It will be seen from FIGURES 1, 5 and 6 that the tray bodies 12 are approximately of trough-shaped form with open opposite ends. The end rails 36 located at these opposite ends not only reinforce the tray body, but also prevent bread loaves or other articles from sliding out from either end and thus act as stops, yet the tray body 12 is free from end walls which in prior bread trays have complicated the construction as well as preventing easy loading, compact nesting and safe stacking.

The bearing plates 42 in the tray 10 of the present invention serve four purposes: first, they act as bearings for receiving the ends 64, 82 or 92 of the bail rods 66 and at the same time their slots 54 cooperating with the detent portions 74, prongs 88 or rivet heads 98 hold the bail rods 66 in their retracted positions beneath the tray bottom wall 14 (FIGURE 2). Second, they carry the load of the trays stacked above and transfer this load to the bail rods 66 on the trays below, with the result that the tray body 12 actually takes very little, if any, of the load. Third, the tubular loops 48 and 50 of the bearing plates 42, in conjunction with the side rails 22, serve as end stops engaging the bail rods 66 of the tray below so as to prevent shifting of the trays when stacked. Fourth, the bearing plates 42 lock together the tray assembly consisting of the tray body 12, the bottom end rails 36, and the bail rods 66.

The open-ended trays 10 of the present invention have the additional advantage of facilitating loading and unloading of the loaves of bread or other articles carried by them. For, example, bread may be loaded directly from the bread-wrapping machines at the bakery at reduced cost. Bakeries now use folded paper cartons and other containers which require one man to handle or assemble the containers and another man to place the loaves of bread in the containers as they come from the wrapping machine. Since these containers have four sides, the bread must be handled by the wrapping machine operator who usually picks up four or five loaves at a time and places them in the container. The great structural strength possessed by the bread trays of the present invenion enables them to be stacked freely and safely without crushing or collapsing, in contrast to many prior bread containers generally used.

Due to the fact that bread is moved from the wholesale bakeries to distribution points in large trailers, a heavy load is imposed upon the bottom layers of containers in the trailer by the weight of the loaded containers above, this load being from 200 to 250 pounds per tier. As a result, bakers have had considerable trouble with paper cartons collapsing under the load. Some other types of containers now in use have rigid flaring or inclined sides which result in waste space and prevent efficient loading of bread in the container and the container in the bakery truck. Still other types of containers used by bakeries have vertical sides parallel to each other and while these containers can be loaded efficiently without waste space in the bakery trucks, they cannot be nested when empty for efficient return to the bakery. Since the sides of the trays 10 of the present invention can be made vertical or parallel to each other when loaded, thus conserving space in the bakery trucks, and the sides can be flared for efficient nesting when the trays are empty, this invention incorporates the chief advantages of both the flaring type of container and the vertical-sided or non-flaring type.

The trays 10 of the present invention, in contrast to paper cartons, are capable of carrying at least a three-hundred pound live load, which is more than sufficient to sustain the loads encountered in the trailer. Moreover, the trays 10 of the present invention are adapted for stacking ten or twelve high on a special cart developed to facilitate the carrying of loaded and empty trays between the bakery delivery trucks and the retail stores. Unlike the paper cartons and other delivery containers which have to be unloaded by the bakery driver onto the retail store counter, the trays of the present invention can be left loaded in the retail store and hung in a special rack devised by the present inventor for this purpose, and supplied to the retail store by the wholesale baker. The combination of this rack holding several of the loaded trays of the present invention replaces bread display racks now furnished retail stores by wholesale bakeries in the use of which the loaves of bread have to be unloaded from their cartons or other containers now in use and placed on the display racks. When the trays 10 of the present invention have been emptied by the customers of the retail store they are removed from the rack, picked up by the bakery driver and returned to the bakery for reuse.

Thus, the trays 10 of the present invention save time and labor at each stage of their use, first by enabling the direct loading of bread through their open ends at the bread wrapping machine; second by facilitating efficient loading into the bakery delivery trucks, due to the fact that they have a positive interstacking feature and their sides can be made either vertical for compact loading of bread in the trays and the trays in the truck, or outwardly inclined for compact nesting of empty trays; and third, their adaptability as display fixtures in the retail stores, when used in conjunction with the above-mentioned inexpensive racks, makes it unnecessary for the driver to unload the bread from the trays when making his delivery to the store. The ease with which the trays can be converted from vertical-sided containers to containers having outwardly-inclined or flaring sides makes them particularly adaptable to the handling of bread and other commodities.

What I claim is:

1. A nestable stacking tray comprising an approximately trough-shaped tray body having a bottom wall and upstanding opposite side walls swingably attached to the opposite edges of said bottom wall and substantially open opposite ends; and a plurality of tray-operating supporting structures having pivot portions pivotally engaging the lower portion of said tray body near the opposite ends thereof and disposed transversely thereto, said tray-operating supporting structures being swingable from retracted positions beneath said bottom wall into upstanding tray-supporting positions embracing said side walls and projecting thereabove.

2. A nestable stacking tray, according to claim 1, wherein said tray body is of resilient self-sustaining sheet material and wherein said side walls are integral with said bottom wall.

3. A nestable stacking tray, according to claim 1, wherein said tray-operating stacking structures comprise approximately rectangular frames having interrupted bottom portions pivotally attached to said tray body beneath said bottom wall and substantially parallel side portions and a bridge portion interconnecting said side portions.

4. A nestable stacking tray, according to claim 3, wherein side members are secured to the upper edge of said tray body side walls and extend therealong and wherein the opposite ends of said side members form stops limiting the upward swinging of said frames toward one another.

5. A nestable stacking tray, according to claim 4, wherein detent members are secured to the upper end portions of said side walls in spaced relationship to said opposite ends of said side members and releasably engageable with said frames in retaining relationship therewith.

6. A nestable stacking tray, according to claim 4, wherein said side members have opposite end stop portions disposed closer to one another than the pivot axes of said frames, whereby said frames come to rest in upstanding tray-stacking positions inclined toward one another.

7. A nestable stacking tray, according to claim 1, wherein bearing members are connected to said tray body beneatth said bottom wall and near the opposite corners of said bottom wall and have bearing bores pivotally receiving said pivot portions of said tray-operating stacking structures.

8. A nestable stacking tray, according to claim 7, wherein said bearing members have recesses therein adapted to retainingly engage the upper portions of the tray-operating stacking structures of a similar nestable stacking tray disposed therebelow in stacked relationship therewith.

9. A nestable stacking tray, according to claim 7, wherein end stop members are secured to said tray body near the opposite ends thereof and wherein said bearing members are secured to said stop members.

10. A nestable stacking tray, according to claim 7, wherein said bearing members are secured to said bottom wall.

11. A nestable stacking tray, according to claim 9, wherein said bearing members are secured to said bottom wall and have extension portions secured to said end stop members.

12. A nestable stacking tray, according to claim 11, wherein said end stop members have cutaway portions near the opposite ends thereof and wherein said extension portions are disposed in said cutaway portions.

13. A nestable stacking tray, according to claim 7, wherein said pivot portions of said tray-operating stacking structures and said bearing members have interengaging releasable detent portions releasably holding said tray-operating stacking structures in their retracted positions beneath said bottom wall.

14. A nestable stacking tray, according to claim 1, wherein said side walls are responsive to engagement by said tray-operating supporting structures during the upward swinging thereof for swinging from outwardly-inclined tray-nesting positions to vertical substantially parallel tray-stacking positions.

References Cited in the file of this patent
UNITED STATES PATENTS

| | | |
|---|---|---|
| 2,148,439 | Crawford | Feb. 28, 1939 |
| 2,395,542 | Fordon | Feb. 26, 1946 |
| 2,663,391 | Kuhns | Dec. 22, 1953 |
| 2,747,748 | Barefoot | May 29, 1956 |